G. C. AVERY.
Scissors and Shears.
No. 219,340.  Patented Sept. 9, 1879.
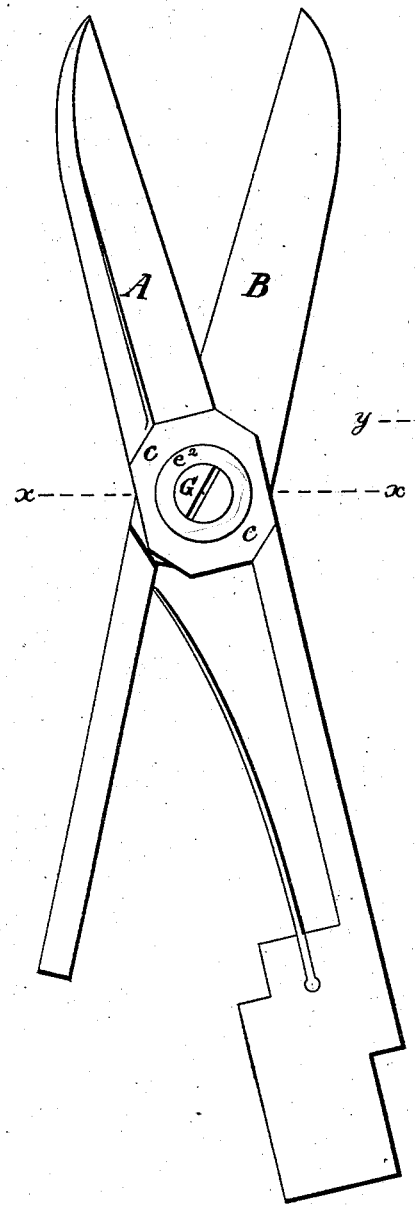
Fig 1.
Fig 4.
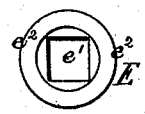
Fig 5.
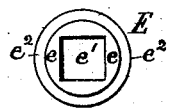
Fig 6.
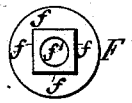
Fig 7.
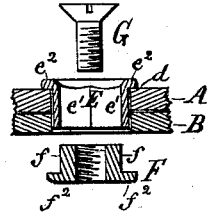
Fig 2.
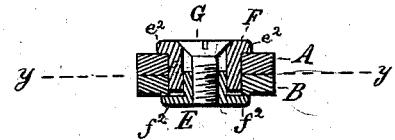
Fig 3.
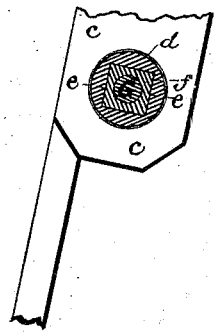
Witnesses:
I. P. Th. Lang
I. H. Theo. Lang.
Inventor:
George C. Avery
by
Mason Fenwick Lawrence

UNITED STATES PATENT OFFICE.

GEORGE C. AVERY, OF LOUISVILLE, KENTUCKY.

IMPROVEMENT IN SCISSORS AND SHEARS.

Specification forming part of Letters Patent No. 219,340, dated September 9, 1879; application filed May 9, 1879.

*To all whom it may concern:*

Be it known that I, GEORGE C. AVERY, of Louisville, in the county of Jefferson and State of Kentucky, have invented a new and useful Improvement in Scissors and Shears; and I do hereby declare that the following is a full, clear, and exact description thereof, reference being had to the annexed drawings, which form a part of this specification, and the letters of reference marked thereon, in which drawings—

Figure 1 is an enlarged plan view of my improved scissors or shears. Fig. 2 is a cross-section in the line $x\, x$ of Fig. 1. Fig. 3 is a horizontal section in the line $y\, y$ of Fig. 2. Fig. 4 is a plan view of a pivotal collet upon which the blades of the scissors or shears articulate. Fig. 5 is an inverted plan view of Fig. 4. Fig. 6 is an inverted plan view of the screw-threaded collet F, shown in section in Figs. 2 and 7. Fig. 7 is a view, part in elevation and part in section, showing the pivotal collet inserted in working position and ready to receive the screw-collet and screw, as shown in Fig. 2, whereby the blades of the scissors or shears are united.

The object of my invention is to furnish scissors, shears, and other like implements the blades or limbs of which articulate in a similar manner to scissors or shears with a pivotal connection, by which the blades may be adjusted together as they wear away by use, and which adjustment, when made, will remain unaffected by the movements of the blades in the act of use of the implement.

In the drawings, A and B indicate the two blades of a pair of scissors or shears, enlarged, as at $c$, and with a circular perforation, as at $d$, to receive the pivotal connection by which the blades are united and held together.

E represents a steel pivotal collet having a circular rim, $e^2$, projecting over its neck $e$, the length of which neck is less than the united thickness of the blades through which this collet passes, as shown.

The neck $e$ is of circular form exteriorly, and of a diameter to nicely fit in the perforation $d$ through the blades. The interior of this collet is made with a square perforation, as at $e^1$, and at its upper end is made with a countersink to receive the screw G, as shown in Fig. 2.

F is a steel screw-collet provided with a rim, $f^2$, corresponding with the rim $e^2$ of the pivotal collet E. Its neck $f$ is made square exteriorly, as shown, and to nicely fit into the square-sided perforation $e^1$ of the collet E, as indicated in Fig. 2, while centrally it is made with a round perforation, $f^1$, and screw-threaded to receive the screw G, as indicated in Fig. 2.

In Fig. 7 I have shown the blades A and B about to be united and held together by the pivotal collet E, screw-collet F, and screw G. This figure shows the collet E already in position and ready to receive the collet F, and thereafter the screw G.

When the blades of the scissors or shears have been united, as described, and as clearly shown in Fig. 2, the rims $e^2$ and $f^2$ of the respective collets will overlap a portion of the metal of the blades, as shown in Fig. 2, and, as the screw G is made to engage with the screw-threaded collet F, it is manifest that, by tightening up the screw, the blades may be drawn together to any desired degree.

It will also be seen that when the several parts are in position, as shown in Fig. 2, a space will be left between the inner end of the collet E and the inner face of the rim $f^2$ of the collet F, so that as the blades wear away by use they may be properly adjusted by tightening the screw, in order to compensate for such wear; and, finally, that as the collet E cannot turn upon the collet F, nor the collet F turn within the collet E, and as the office of the screw is to simply hold these parts together, and through them hold and adjust together the blades, the articulations of the blades upon the collet E in the act of use will not effect a loosening of the screw, whatever its tightened working condition (more or less) may be. In other words, the screw G does not serve as a pivotal axis or pintle upon which the blades of scissors and shears, as heretofore constructed, are made to articulate in the act of use; and hence, by my construction, as set forth, the annoyance and ineffectiveness of the ordinary scissors or shears, due to the loosening of the screw or pintle which unites their blades, are obviated.

What I claim is—

The combination of the collets E and F and the screw G with the blades A and B of a pair of scissors or shears, or other like implement, substantially as and for the purpose described.

Witness my hand in the matter of my application for a patent on an improved joint for scissors.

GEORGE C. AVERY.

Witnesses:
J. F. MUNSON,
H. A. HALL.